United States Patent Office 3,528,833
Patented Sept. 15, 1970

3,528,833
CAST CELLULOSE ACETATE FILM HAVING HIGH SLIP
Henry T. Taskier, Englewood, N.J., assignor to Celanese Corporation, New York, N.Y., a corporation of Delaware
No Drawing. Filed Feb. 24, 1967, Ser. No. 618,329
Int. Cl. C08b *27/22;* C08h *11/00*
U.S. Cl. 106—171                                      10 Claims

ABSTRACT OF THE DISCLOSURE

Cast cellulose acetate film characterized by a high slip surface is made by including a small amount of a partial ester of sorbitan and a higher fatty acid such as sorbitan monostearate or sorbitan mono-oleate as an internal slip agent in the plasticized diacetate dope from which the film is cast. As a further option a small amount of a free higher fatty acid may be included to facilitate stripping the freshly cast film from the substrate on which it has been formed.

BACKGROUND OF INVENTION

Cellulose acetate film is usually produced by casting a solution or dope which is prepared by dissolving cellulose diacetate flake and a minor amount of an ester plasticizer such as a lower dialkyl phthalate in a suitable volatile solvent. The inclusion of a plasticizer in the dope is usually required in order to provide a cast film having the desired degree of flexibility or pliability. However, the inclusion of a plasticizer also inherently tends to result in a film having a relatively high coefficient of friction which makes the film unsuited for end use applications requiring a high degree of slip. Various additives or compositions based on partial fatty acid esters of polyhydric alcohols such as ethylene glycol, polyethylene glycol or glycerol have been previously proposed for the purpose of lubricating fibers or films derived from cellulose acetate. However, these prior attempts have generally required the use of relatively high proportions of such slip agents in the cellulose acetate dope or the application of the agent to a cast film in a separate operation. This has generally been relatively costly and frequently has resulted in an impairment of the desired optical or mechanical properties of the film or made the film undesirably susceptible to the action of various solvents with which it might subsequently come in contact.

SUMMARY OF INVENTION

It is an object of the present invention to provide a cellulose acetate film having good optical and mechanical properties as well as a low coefficient of friction. The invention has accomplished this object by including in the customary cellulose acetate solution or dope a very small amount such as 0.25 to 0.75 or 1.0%, based on the weight of dissolved cellulose diacetate, of a partial higher fatty acid ester of sorbitan and particularly of sorbitan monostearate or sorbitan monooleate. A particularly desirable film is produced if a very small amount of an essentially saturated higher fatty acid such as lauric, stearic, or palmitic acid, or mixtures of such $C_{12}$ to $C_{18}$ fatty acids, is also included in the casting solution. For instance, such free acid may be included in the solution in an amount within the range between about 20 and 120% based on the weight of the sorbitan ester present. The free fatty acid tends to improve film quality by avoiding stripping difficulties which sometimes may be encountered in high speed production.

DETAILED DESCRIPTION

The principal conventional components of a casting dope formulated in accordance with the present invention are secondary cellulose acetate, a suitable high boiling ester plasticizer therefor and a volatile solvent such as acetone, methylene chloride, dimethyl formamide or a mixture of two or more of such solvents. Methanol or ethanol can also be used as co-solvents in admixture with one or more of the solvents just mentioned. The solvent generally constitutes about 65 to 80% of the casting solution, preferably from about 65 to 75%.

The cellulose acetate is preferably supplied in the form of secondary cellulose acetate flake containing from about 52 to 56% of combined acetic acid. Typically, a 20% solution of such cellulose acetate in a solvent comprising 9 parts acetone and 1 part ethanol has a viscosity of between about 21 and 82 seconds when determined by the falling ball method (ASTM D 851–56) using a stainless steel ball $\frac{3}{32}$ inch in diameter.

Suitable ester plasticizers for the cellulose acetate include particularly dialkyl esters of phthalic acid such as dimethyl or diethyl phthalate but a wide variety of other esters of a higher alkanol, diol or triol and an aliphatic carboxylic acid which consists essentially of carbon, hydrogen and oxygen, which esters contain between about 8 and 18 carbon atoms per molecule and which are freely soluble in the cellulose acetate are also usable. Accordingly, examples of such other usable ester plasticizers include 2,2,4-trimethyl-1,3-pentane diol diisobutyrate, glycerol triacetate, glycerol tripropionate, triethyl citrate, triethyl and triphenyl phosphate, dimethoxy ethyl phthalate, di(ethylene glycol monomethyl ether) phthalate, ethyl phthalyl ethyl glycollate, triethyl acetyl, triethyl citrate and so forth. The specific choice of a particular plasticizer is not important from the point of view of the present invention. Customarily such a plasticizer or blend of plasticizers is included in the dope in a concentration of from between about 5 to about 40%, preferably between 9 and 25% based on the weight of the diacetate flake used in the solution. If a pigmented film or sheet is desired a minor amount of a customary type of pigment may also be included in the dope. For instance, titanium dioxide in a proportion of from about 6 to 10% based on the weight of the diacetate may be used in making film of the type suitable for the fabrication of playing cards.

As is otherwise well known a film or sheet is made from such a dope or solution of plasticized cellulose acetate by depositing it continuously from a reservoir through a slit in the form of a film onto a highly polished surface of a slowly moving wheel or band, causing the film to set by evaporation of solvent, stripping the film from the substrate and curing out residual solvent, whereupon the finished film is wound up on a roll.

The essential feature of the present invention involves the inclusion in such conventional dope of 0.25 to 1.0 part, preferably 0.3 to 0.7 part, per hundred parts of diacetate flake of a partial ester of sorbitan comprising on the average about one or two acid residues of a higher fatty acid such as stearic or oleic acid per mole of the ester.

The invention will next be illustrated in terms of some specific representative embodiments. The cellulose acetate used in all these tests was cellulose diacetate flake containing 54.3 to 55.3% combined acetic acid. A solution of this flake in acetone-ethanol (90–10) characteristically had a viscosity of between about 21 and 82 seconds (ASTM D 851–56; $\%_{32}''$ ball).

Diethyl phthalate was used as the plasticizer in tests 1, 2 and 3 (Table I) while 2,2,4-trmiethyl-1,3-pentane diol diisobutyrate ("TIB") was used in tests 4, 5 and 6 (Table II). In each case the casting solution was prepared by dissolving 100 parts of diacetate flake, and the indicated amounts and types of plasticizer and other additive (if any) in 300 parts of acetone.

The solutions were cast on a highly polished substrate with the aid of a casting knife to produce dry films of approximately 1.0 mil gauge.

In the first set of comparative results, reported in Table I, Run No. 1 was a control wherein no slip agent was used; in Run No. 2, 0.5 part of sorbitan monostearate was included (per 100 parts cellulose diacetate); and in Run No. 3, 0.5 part sorbitan monostearate and 0.38 part stearic acid was included per 100 parts of cellulose diacetate. The reported results clearly show that in each instance both the static coefficient of friction ($\mu_s$) and the kinetic coefficient of friction ($\mu_k$) were substantially lower in the case of films No. 2 and 3 than in the control film. Moreover, film No. 3 which contained both sorbitan monostearate and free stearic acid had a lower coefficient of friction than film No. 2 when measured "air to wheel" (A/W) or "air to air" (A/A). When measured "wheel to wheel" (W/W) the coefficient of friction of films No. 2 and 3 was substantially the same. The haze of all films was very nearly the same, with the control film having the lowest haze and film No. 3 having a slightly lower haze than film No. 2.

TABLE I

| Film No. | 1 (control) | 2 | 3 |
| --- | --- | --- | --- |
| Gauge, mils | 1.0 | 1.0 | 1.0 |
| Diacetate flake | 100 | 100 | 100 |
| Plasticizer | 17 | 17 | 17 |
| Sorbitan monostearate | | 0.5 | 0.5 |
| Stearic acid | 0.38 | | 0.38 |
| Coefficient of friction: | | | |
| Static $\mu_s$: | | | |
| A/W | 0.61 | 0.48 | 0.40 |
| A/A | 0.61 | 0.52 | 0.48 |
| W/W | 0.54 | 0.41 | 0.43 |
| Kinetic $\mu_k$: | | | |
| A/W | 0.53 | 0.44 | 0.35 |
| A/A | 0.55 | 0.49 | 0.35 |
| W/W | 0.60 | 0.35 | 0.35 |
| Haze, percent | 1.2 | 1.4 | 1.3 |

It should be understood that the film surface which forms on the casting wheel as the film is cast has somewhat different friction characteristics than the film surface which is exposed to the atmosphere during the casting process. The "air to wheel" coefficient of friction is representative of the friction to be overcome as a film wound up in a roll is unwound. "Air to air" and "wheel to wheel" coefficients are representative of the friction to be overcome when a strip of film is bent back over itself or when articles packaged in the film are stacked on top of each other. The coefficient of friction is determined by placing two strips of film on top of each other with the appropriate surface facing each other and then drawing the top film over the fixed bottom film by means of a sled under standard conditions.

Another set of comparative results is shown in Table II wherein a somewhat different basic formula was used and the film prepared from this basic formula was compared with films prepared from the same basic formula modified by the further inclusion of a small amount of sorbitan monooleate or sorbitan monostearate. As can be seen from Table II the films prepared from the formulas containing a sorbitan monoester had a significantly lower coefficient of friction than the film prepared from the basic formula. The sorbitan monostearate in particular gave a very low coefficient of friction when measured air to wheel whereas the sorbitan mono-oleate gave the lowest coefficient of friction when measured air to air.

TABLE II

| Film No. | 4 (control) | 5 | 6 |
| --- | --- | --- | --- |
| Cellulose diacetate flake | 100 | 100 | 100 |
| TIB (plasticizer) | 10 | 10 | 10 |
| Stearic acid | 0.38 | | |
| Aluminum hydrate, white amorphous powder (antiblock agent) | 0.56 | 0.56 | 0.56 |
| Sorbitan mono-oleate (Span 80) | | 0.5 | |
| Sorbitan monostearate (Span 60) | | | 0.5 |
| Coefficient of friction: | | | |
| Air/wheel: | | | |
| $\mu_s$ | 0.65 | 0.50 | 0.38 |
| $\mu_k$ | 0.58 | 0.45 | 0.28 |
| Air/air: | | | |
| $\mu_s$ | 0.70 | 0.48 | 0.55 |
| $\mu_k$ | 0.63 | 0.42 | 0.48 |
| Light transmission, percent | 92.7 | 91.4 | 92.5 |
| Haze, percent | 0.9 | 1.0 | 1.6 |
| Gauge, mils | 1.5 | 1.3 | 1.3 |

It should be understood that in the absence of a contrary indication all amounts and proportions of materials are expressed in this specification on a weight basis. It should likewise be understood that the foregoing specific embodiments have been disclosed principally for purposes of illustration rather than limitation and that many different variations of the disclosed invention are possible without departing from the scope of the appended claims.

I claim:

1. A high slip film composition comprising 100 parts of cellulose diacetate, 5 to 40 parts of an ester plasticizer therefor and about 0.25 to 1.0 part of a monoester of sorbitan and a higher fatty acid having from 12 to 18 carbon atoms per molecule.

2. A film composition according to claim 1 which further comprises about 20 to 120%, based on said sorbitan monoester, of an essentially saturated higher fatty acid having from 12 to 18 carbon atoms per molecule.

3. A film composition according to claim 1 wherein the sorbitan monoester is sorbitan mono-oleate.

4. A film composition according to claim 1 wherein the sorbitan monoester is sorbitan monostearate and wherein the film composition further comprises about 50 to 100%, based on said sorbitan ester, of free stearic acid.

5. A film composition according to claim 1 wherein the ester plasticizer is a higher alkyl ester of an alkanoic acid.

6. A cast cellulose acetate film which is composed of 100 parts of cellulose diacetate, 10 to 40 parts of a lower dialkyl phthalate plasticizer, and 0.25 to 1 part of sorbitan monostearate.

7. A cast cellulose acetate film according to claim 6 which further comprises between about 50 to 100%, based on the weight of the sorbitan monostearate, of free stearic acid.

8. A dope for casting cellulose acetate film which comprises, dissolved in acetone solvent, 100 parts of cellulose diacetate, 10 to 25 parts of an ester plasticizer containing from 8 to 18 carbon atoms per molecule and as an internal slip agent 0.25 to 1 part of a monoester of a higher fatty acid having from 12 to 18 carbon atoms per molecule esterified with sorbitan.

9. A dope according to claim 8 which further comprises from 50 to 100% stearic acid based on the weight of said internal slip agent.

10. In the process of producing a film of plasticized cellulose acetate by casting an acetone solution containing a major proportion of cellulose diacetate and a minor proportion of an ester plasticizer on a smooth solid surface, drying the cast film by evaporating acetone solvent therefrom, and stripping the resulting dry film from said solid surface, the improvement which comprises incorporating in the acetone solution (a) about 0.25 to 1.0 part of an internal slipping agent selected from the group consisting of sorbitan monostearate and sorbitan monooleate, and (b) about 50 to 100%, based on said slipping agent, of free stearic acid.

References Cited

FOREIGN PATENTS 113,483   3/1940   Australia.

OTHER REFERENCES

The Chemistry and Technology of Waxes, Albin H. Warth, Reinhold Publishing Co., 1956, pp. 539–540.

Chemical Abstracts, (Abrasion) resistance of lubricating films with particular reference to unimolecular layers, vol. 59, 1963, p. 6168e.

MORRIS LIEBMAN, Primary Examiner

R. H. ZAITLEN, Assistant Examiner

U.S. Cl. X.R.

106—167, 169

UNITED STATES PATENT OFFICE
CERTIFICATE OF CORRECTION

Patent No. 3,528,833      Dated September 30, 1970

Inventor(s) Henry T. Taskier

It is certified that error appears in the above-identified patent and that said Letters Patent are hereby corrected as shown below:

Please correct the errors on page 2, column 3 line 9 the word _trimethyl_. It is spelled wrong. On page 2 column 4 line 50 change the word _ester_ to the word _monoester_.

SIGNED AND SEALED
NOV 17 1970

(SEAL)
Attest:

Edward M. Fletcher, Jr.
Attesting Officer

WILLIAM E. SCHUYLER, JR.
Commissioner of Patents